Nov. 9, 1971   R. N. MILLER   3,618,374
METHOD FOR MEASURING SURFACE CLEANLINESS
Filed March 24, 1969
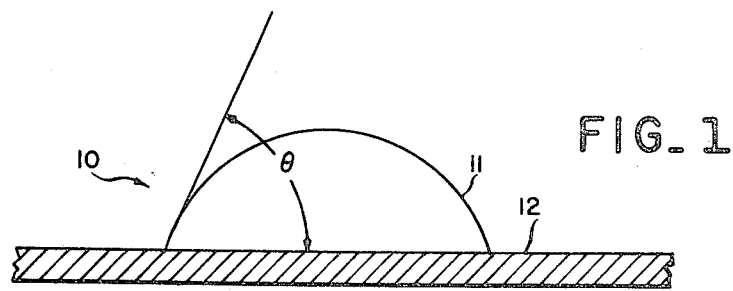
FIG_1
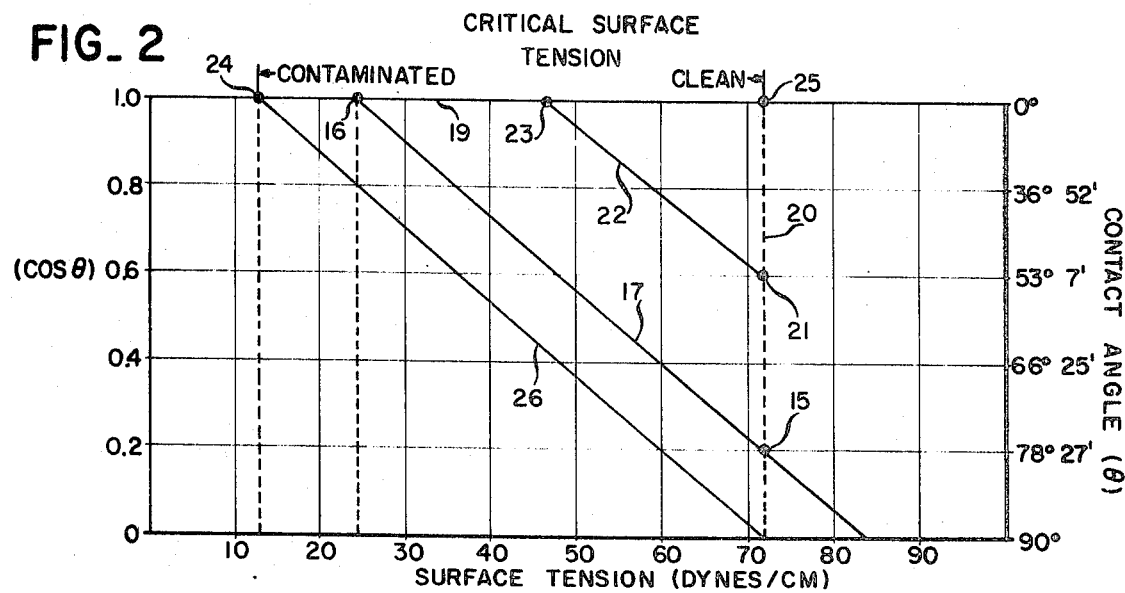
FIG_2
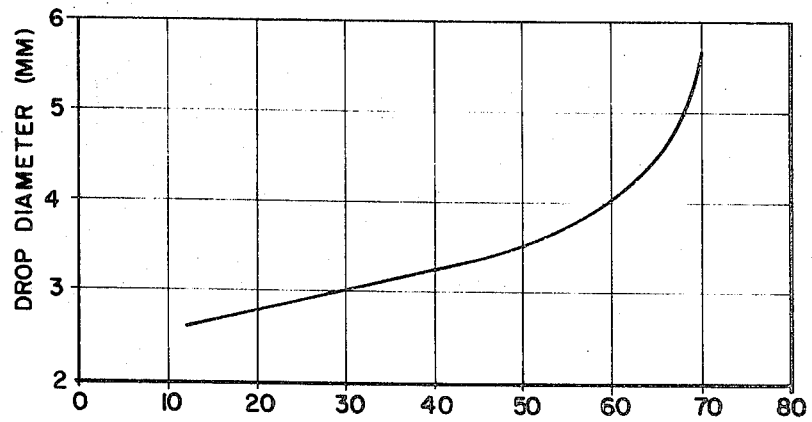
FIG_3
INVENTOR.
ROBERT N. MILLER
BY George C. Sullivan, agent
Roger T. Frost
Attorney United States Patent Office 3,618,374
Patented Nov. 9, 1971

3,618,374
METHOD FOR MEASURING SURFACE CLEANLINESS
Robert N. Miller, Atlanta, Ga., assignor to Lockheed Aircraft Corporation, Burbank, Calif.
Filed Mar. 24, 1969, Ser. No. 809,726
Int. Cl. G01n *13/02, 19/02*
U.S. Cl. 73—104      4 Claims

ABSTRACT OF THE DISCLOSURE

A surface cleanliness measuring technique which is practicable in a field or paint shop environment and which provides a quantitative evaluation of the extent to which unwanted contamination has been removed from a surface. The relation between the critical surface tension of a water droplet of constant volume and the droplet contact angle is established for a desired surface material, and this relation is correlated with the droplet diameter to enable the critical surface tension of the surface material to be determined by measuring the diameter of a water droplet of predetermined volume disposed on the surface.

---

This invention relates in general to cleanliness measurement and in particular to a method and apparatus for obtaining a quantitative measurement of the cleanliness of a surface.

There are many instances where a surface must be cleaned sufficiently to permit some subsequent operation to occur. For example, a surface that is to be painted must first have such contaminants as oil, grease, and particulate matter removed from the surface so that the coating of paint to be applied will adhere properly to the surface. This requirement for adequate surface cleanliness is especially important where a smooth metallic surface such as the skin of an aircraft is to be painted, since the smoothness of such surfaces required by other considerations minimizes coating adhesion through the keying action between the coating film and surface irregularities. Coating adhesion in such cases depends substantially on other adherent mechanisms such as molecular attraction between the metallic surface and the applied coating, and good molecular bonding is achieved only when the surface is sufficiently free of contamination.

The cost of cleaning a surface to be painted rises rapidly when the surface being cleaned is part of an assembled structure such as an aircraft or an aircraft assembly. While a surface can be deliberately overcleaned beyond the minimum extent necessary for the desired coating adhesion, to assure that the surface is "clean enough," the expense of such overcleaning of the surface is completely wasted; moreover, in the case of an aircraft, the additional time spent in unnecessary overcleaning of surfaces to be coated keeps the aircraft removed from revenue-producing service for an additional and unnecessary amount of time.

Prior art techniques for determining quantitatively the cleanliness of a surface have been inappropriate or unusable for applications such as a paint shop or a similar working environment in which the controlled standards, skilled operating personnel, and exacting equipment of the laboratory cannot economically be achieved. In one such prior art technique, for example, a radioactive soiling compound is applied to a surface and the residual radioactivity is measured after the surface has been cleaned. While this technique is very sensitive, it is not suitable for production use or field use because of the precautions required for the radiation hazards involved. Prior art cleanliness tests which are used in a production environment generally require the application of a film or mist of water to the surface. If this water film or spray flows or "sheets" on the surface and does not break into beads, the surface energy of the surface is greater than the surface tension of water (approximately 72 dynes/cm.), and the surface is assumed to be sufficiently clean for subsequent coating. However, coatings such as paint films frequently will adhere tightly to surfaces which do not meet this exacting standard of cleanliness, and so it becomes desirable to have a quantitative cleanliness measuring technique which overcomes the deficiencies of the prior art.

Accordingly, it is an object of the present invention to provide an improved method and apparatus for measuring the cleanliness of a surface.

It is another object of this invention to provide an improved surface cleanliness measuring method and apparatus which provides a quantitative indication of the extent of contamination of a surface.

It is a further object of this invention to provide a surface cleanliness measuring method and apparatus which can be practiced effectively in field conditions outside of the controlled environment of a laboratory such as a paint shop or the like.

Still another object of this invention is to provide an improved surface cleanliness measuring method and apparatus which is economically usable to eliminate the necessity of overcleaning a surface to obtain a desired minimum level of surface decontamination.

The exact nature of this invention as well as other objects and advantages thereof will be readily apparent from consideration of the following specification relating to the annexed drawing in which:

FIG. 1 shows an elevation view indicating the contact angle of a liquid drop on a surface;

FIG. 2 relates in graphic format the application of the present invention to the measurement of cleanliness of a particular surface material; and FIG. 3 shows a graphical representation of the critical surface tension of a particular surface material plotted as a function of the liquid drop diameter as determined through the application of the present invention.

Stated generally, the technique of the present invention develops a relationship between the angle of contact which a liquid drop forms when disposed on a surface and the critical surface tension of the surface. This relationship is consistently predictable for a particular surface material over conditions of surface contamination ranging from substantially clean, i.e., free of contamination, to a contamination level whereat a coating cannot reasonably be expected to adhere to the surface. The present technique thus effectively covers the usable range of surface contamination that is encountered during the decontamination and coating of surfaces. The "critical surface tension of wetting," as the term is used herein, of a material surface is defined to be the maximum surface tension of a particular liquid which just causes substantially complete wetting of the surface by the liquid as evidenced by a surface-liquid contact angle substantially equal to zero. A correlation is also obtained between the diameter assumed by a drop of constant volume placed on a surface being examined and the critical surface tension of the surface.

Considering the technique of the present invention in greater detail and referring to FIG. 1 hereof, there is shown generally at 10 a drop 11 of a suitable liquid such as water disposed on a substantially horizontal surface 12. The contact angle of the drop 11 with the surface 12 is shown as angle $\theta$, and this angle is determined by the surface tension of the particular liquid and also by the surface energy of the surface 12. For a surface of a particular material the surface energy of the material as seen by the liquid drop is inversely proportional to the extent of contamination on the surface, and testing techniques are known to those skilled in the art which indicate the relative ability of various coatings to adhere to a surface having a particular level of contamination. In this way a minimum level of surface energy can be determined below which the desired coating adhesion cannot be obtained empirically for a particular coating or class of coatings.

It is know to those skilled in the art that the relationship between the measured surface tension of drops of a series of homologous liquids on a particular surface and a function of the angle of contact formed by these drops is substantially linear. If the cosines of the contact angles of drops of various homologous liquids on a particular surface material are graphically plotted with respect to the surface tension of the various liquid drops, accordingly, a straight line can be closely fitted to the various plotted points on the graph. Corresponding linear relationships can be observed when drops of the same homologous liquids are placed on other surfaces which have different critical surface tensions of wetting, and plotting of the contact angle cosines with respect to the measured liquid surface tensions for several such surfaces yields a set of substantially parallel straight lines which are closely fitted to the plotted points for each surface. This is shown in greater detail in the publication Adhesion and Cohesion, Elsevier Publishing Company, 1962.

The contact angle which a drop of a given liquid forms on a surface depends upon the surface energy, and this factor in turn depends upon the amount of contamination on the surface. However, the slope of the parallel linear relationships described above between the liquid drop surface tension and a function of the contact angle remains unchanged for varying degrees of surface contamination of a particular surface material. Of course, a grossly dirty surface may prevent the formation of a liquid drop capable of meaningful contact angle measurement, but this extent of contamination is readily apparent to the observer and would obviously have a detrimental effect on coating adhesion characteristics. Once the slope of the aforementioned parallel linear relationship is established, it can be seen that a liquid drop of known surface tension placed on a surface and producing a particular measurable contact angle, determined by the degree of surface contamination, defines a particular one of the set of straight lines that can be represented graphically as described above and as shown in FIG. 2. This relationship can be used as described below to determine the critical surface tension of a particular surface material.

The derivation of the critical surface tension of an exemplary material according to an embodiment of the present invention is now described with reference to FIG. 2. The data and numerical values used in this example are developed for a clad aluminum panel (Type 7075–T6) of the kind used to form the outer skin of an aircraft and are derived as follows. A drop of distilled water is placed on a surface of the material being examined and the contact angle formed by the drop on the surface is determined by any suitable technique, such as photographing an elevation view of the drop and measuring the contact angle shown in the resulting photograph. The angle of contact is measured to be 78°27′ in the example shown. The surface tension of distilled water is known to be about 72.4 dynes/cm., and this information is plotted as point 15 and the graph grid shown in FIG. 2.

The second point required to establish the slope of the linear relationship between surface tension and the cosine of the drop contact angle is obtained by applying water drops of progressively reduced surface tension to the surface until a drop applied to the surface has a zero contact angle (and thus a cosine of 1.0). Adjustment of the surface tension of water is obtained, for example, by adding to the water any suitable agent or solution which reduces the surface tension of the water without materially affecting the viscosity of the water or otherwise adversely affecting the linearity of the relationship being examined. Such additives as isopropyl alcohol, ethyl alcohol, methyl alcohol, and other surface reducing agents similar in viscosity to water can be used for this purpose. When the water drop solution is obtained which just has a zero contact angle, the surface tension of the water solution is measured wtih any suitable surface tension measuring instrument, such as a Fisher Scientific Model 20 surface tensiometer. The measured surface tension of 15 dynes/cm., in the present example, and the cosine corresponding to the zero contact angle are plotted on FIG. 2 as point 16, and a straight line 17 is drawn passing through point 16 and point 15.

Once the data defining line 17 has been determined, the critical surface tension to be expected for contact angles from 0 to 90 degrees can be established from the fact that the relationship between the cosine of the contact angle and the surface tension of the liquid drop for a given surface material, when plotted, yields lines which have the same slope, i.e., which are parallel. When a liquid such as distilled water having a known surface tension is used, then any datum point for a drop of such liquid must lie on a fixed line corresponding to that known value of surface tension; the broken line 20 in FIG. 2 represents the surface tension of distilled water used in the example depicted therein. Since any value of liquid drop surface tension and the corresponding contact angle must lie on a line parallel with line 17, and since the contact angle corresponding to critical surface tension is defined to be zero degrees, it follows that the critical surface tension for a contaminated surface which causes an applied drop of distilled water to assume a particular contact angle is predicted by a line passing through line 20 at a point corresponding to the particular contact angle and extending parallel to line 17 to intersect the zero degree contact angle line 19. The point of intersection with the zero degree contact angle line 19 corresponds to the predicted critical surface tension of the contaminated surface, and this predicted critical surface tension is determined by the amount of contamination present on the surface.

For example, assume that a drop of distilled water placed on a test surface represented by the graph of FIG. 2 has a measured contact angle of 53°7′, corresponding to a cosine of 0.6. The cosine of the contact angle is located at point 21 along line 20 corresponding to the surface tension of distilled water, and line 22 is drawn passing through the point 21 and parallel to the previously established line 17. This line 22 is extended to intersect line 19, indicating zero angle of contact, at point 23. The point 23 thus represents the predicted critical surface tension of the test surface, i.e., the surface tension of a water drop solution which will just cause complete wetting of the test surface as evidenced by a contact angle of zero degrees, and the value of this critical surface tension for the exemplary test surface is shown graphically to be approximately 47 dynes/cm. Stated otherwise, if the surface tension of the water drop on the test surface were lowered to a point where a zero contact angle was just observed, the measured surface tension of the drop at that point would be approximately 47 dynes/cm.

From the foregong, it is apparent that a range of critical surface tension values corresponding to contact angles between 0 and 90 degrees can be established for a particular surface material. This range for the exemplary surface depicted on FIG. 2 extends between the lower limit 24, corresponding to a distilled water contact angle of 90° (a highly contaminated surface) indicated by line 26, and the point 25, corresponding to a distilled water contact angle of 0° (a substantially uncontaminated surface). Once the data for a line 17 has been experimentally determined for a particular surface material and the range of critical surface tension has been determined, as shown herein, a person need only place a drop of distilled water on that surface, measure the contact angle formed by the drop, and then look to a graphical representation of the data as shown for example in FIG. 2 to determine the critical surface tension corresponding to that contact angle. Moreover, the data for a first line 17 can be obtained from a surface having an unknown extent of contamination. It will be understood, of course, that the use of a graphical data presentation as in FIG. 2 to determine the range of critical surface tension and to evaluate the critical surface tension corresponding to a particular measured contact angle is intended only as a visual aid to the comprehension and application of the method comprising the present invention; known mathematical techniques for deriving the slope of a straight line and for establishing a formula for that line and other lines parallel thereto may be used by those skilled in the art in cooperation with or in place of a graph. Such formulae may easily be adapted to mechanized computation with a suitable programmed computer.

The minimum critical surface tension required for the desired adhesion of a coating to a particular surface generally must be determined experimentally since this value of critical surface tension depends upon such individual factors as the surface material, the coating material, and the intended environment of use for the coated surface. Known coating adhesion testing techniques are used to determine the adhesion of coatings applied to surface samples having various critical surface tension values denoting differing amounts of surface contamination, and the minimum acceptable critical surface tension for a particular surface coating an environment can be empirically determined from this information. Although specific values of critical surface tension corresponding to a minimum acceptable level of surface cleanliness do not comprise part of the present invention, it has been determined by way of example that a critical surface tension of at least 40 dynes/cm. is required for the clad aluminum material represented in FIG. 2, as used to form the skin of a subsonic aircraft, for acceptable adhesion of Mil–P–23377 epoxy polyamide primer and Mil–C–22750 epoxy polyamide top coat typically used on the outer skin of such aircraft.

Use of the method described thus far requires the direct measurement of the contact angle formed by a liquid drop on a surface. This angle measurement tends to be time-consuming and therefore less than ideal under field conditions as found in a paint shop or a production pre-painting cleaning facility. To overcome this problem, a correlation is devised whereby measurement of the diameter of the liquid drop provides an evaluation of the contact angle and a direct indication of the critical surface tension. The following equation gives the relationship between drop diameter, drop volume, and the average contact angle:

$$\frac{D^3}{V} = \frac{24 \sin^3 \theta}{(2 - 3 \cos \theta + \cos^3 \theta)} \quad (1)$$

where $D$ = drop diameter in mm.
$V$ = drop volume in microliters
$\theta$ = contact angle Equation 1 is valid for drops up to 8 microliters in volume, since the effects of gravity introduced a significant error when drops larger than 8 microliters are used.

The relationship between drop diameter and critical surface tension for a particular surface material is obtained by measuring drops of a known fixed volume—for example, 5 microliters—substituting the measured diameter and known volume into Equation 1, and solving this equation for cosine $\theta$. When this is done for a number of representative drop diameters, the measured and computed results for the material can be tabulated as follows:

| Drop diameter, mm. | Cos $\theta$ | $\theta$ | Critical surface tension (dynes/cm.) |
|---|---|---|---|
| 2.627 | 0 | 90° | 13.0 |
| 2.69 | .05 | 87°8′ | 16.0 |
| 2.76 | .090 | 84°16′ | 18.0 |
| 2.84 | .160 | 80°13′ | 22.5 |
| 2.91 | .191 | 78°54′ | 24.0 |
| 2.98 | .250 | 76°56′ | 27.5 |
| 3.05 | .282 | 73°37′ | 29.4 |
| 3.12 | .331 | 72°12′ | 32.0 |
| 3.19 | .390 | 67°3′ | 36.2 |
| 3.27 | .416 | 65°25′ | 37.0 |
| 3.34 | .465 | 62°17′ | 40.0 |
| 3.41 | .531 | 58°0′ | 44.0 |
| 3.48 | .570 | 55°15′ | 46.0 |
| 3.55 | .622 | 51°32′ | 49.2 |
| 3.62 | .655 | 49°4′ | 51.3 |
| 3.69 | .700 | 45°34′ | 54.0 |
| 3.76 | .722 | 43°47′ | 55.4 |
| 3.83 | .750 | 41°25′ | 56.7 |
| 3.90 | .770 | 39°39′ | 58.0 |
| 3.97 | .795 | 37°21′ | 59.5 |
| 4.05 | .805 | 36°23′ | 60.0 |
| 4.12 | .820 | 34°55′ | 61.2 |
| 4.19 | .839 | 32°58′ | 62.0 |
| 4.26 | .850 | 31°47′ | 63.0 |
| 4.33 | .860 | 30°41′ | 63.5 |
| 4.40 | .870 | 29°33′ | 64.0 |
| 4.47 | .880 | 28°21′ | 64.7 |
| 4.54 | .889 | 27°15′ | 65.2 |
| 4.61 | .895 | 26°29′ | 65.7 |
| 4.69 | .905 | 25°11′ | 66.1 |
| 4.76 | .912 | 24°13′ | 66.5 |
| 4.83 | .920 | 23°4′ | 67.0 |
| 4.90 | .929 | 21°43′ | 67.5 |
| 4.97 | .935 | 20°46′ | 67.9 |
| 5.04 | .940 | 19°57′ | 68.3 |
| 5.11 | .945 | 19°5′ | 68.8 |
| 5.18 | .947 | 18°44′ | 68.9 |
| 5.25 | .950 | 18°11′ | 69.0 |
| 5.33 | .955 | 17°15′ | 69.3 |
| 5.39 | .957 | 16°52′ | 69.4 |
| 5.46 | .960 | 16°16′ | 69.5 |
| 5.54 | .961 | 16°3′ | 69.9 |
| 5.61 | .962 | 15°51′ | 70.0 |
| 5.68 | .963 | 15°38′ | 70.1 |

Once the relation between drop diameter and $\theta$ (or cosine $\theta$) is established, there remains only to develop the data contained above in the tabular column headed "Critical Surface Tension" for the particular surface material being evaluated. This is done as described above with reference to FIG. 2, and the numerical values of the "Critical Surface Tension" tabulated above are exemplary values for the aluminum skin material used to develop the data graphically displayed in FIG. 2.

Once the information shown by way of example in the table above is developed, this information can be readily converted into a form more usable by a worker who desires to determine the critical surface tension, and thus the degree of contamination, of the particular surface material to which the data corresponds. One manner in which this may be done is shown in FIG. 3, wherein the critical surface tension data from the table is plotted with respect to the drop diameter data from the same table. With the information presented as in FIG. 3, a person determining the extent of contamination of the appropriate surface material need only place on that surface a drop of the liquid, e.g., distilled water, used to develop the critical surface tension data for that type of material, making certain that the drop volume is the same as that used in the computations with Equation 1, and then measure the diameter of the drop. Once this is done, reference to a graph of the type shown by way of example in FIG. 3 provides a direct indication of the critical surface tension of the material. If desired, FIG. 3 could also include some indicia providing a "pass-fail" indication corresponding to a predetermined critical surface tension indicating a desired mnimum level of contamination. Measurement of the droplet diameter can be accomplished with calipers, with an optical device such as a Brinell microscope manufactured by the Bausch & Lomb Company and having an eye piece graduated in millimeters, or in any other suitable manner.

Although detailed data is given herein on the case of the method of this invention with a particular material and this data forms the basis for the graph of FIG. 2, the table set forth above, and the graph of FIG. 3, it will be understood that this is intended only as an operative example ofthe present method and not as a limitation of that method to the particular exemplary surface material. The validity of the method disclosed herein has been demonstrated for other metals, both coated and bare, and also for non-metallic surfaces such as polytetrafluoroethylene (Teflon), the copolymer of tetrafluoroethylene and hexafluoropropylene, and polyhexafluoropropylene. The use of distilled water as the liquid drop substance is a convenient choice because this liquid is readily obtainable, does not contaminate a surface to which it is applied, and has a known surface tension; however, it will be apparent that other liquids could be used as well. The numericanl values produced by other liquids would be different from the values obtained with distilled water drops for a given surface material, but the end results would be identical—namely, the determination of measurable drop diameter indicating a critical surface tension corresponding to a certain degree of surface contamination.

The relative humidity of the atmosphere where the drop diameter is measured can affect the results obtained. It is desirable to perform the drop measurements to obtain the data shown in FIG. 2 and Table I under some standard conditions, such as 50 percent relative humidity, and then to adjust this information as required by the relative humidity of the location where the critical surface tension of a workpiece is being examined. It has been found that a correction factor of 4 dynes/cm. should be made for each variation of 10 percent from the standard relative humidity value of 50 percent, with this correction factor being added for drop diameters measured at relative humidities above 50 perecnt and being substracted for measurements taken below 50 percent relative humidity. It has been determined that deviations from the standard temperature of 77° F. have no significant effect on the surface energy of surface materials.

The cleanliness measuring method as described herein can be used to determine the surface energy of surfaces tilted up 90° from a horizontal position without introducing significant errors in the surface energy reading. However, it may be desired to measure the surface energy of a surface inclined more than 90°—for example, a surface comprising the underside of a structure. This is accomplished according to the present invention by providing a spray atomizer filled with a solution of distilled water and a suitable surface tension adjusting agent such as isopropyl alochol to adjust the surface tension of the solution to some predetermined minimum acceptable value such as, for example, 50 dynes/cm. This solution then is sprayed on the surface under examination. If the drops formed on the panel by the spray are large and irregular in outline and tend to merge into a continuous film or sheet of liquid, the critical surface tension of the surface is greater than the surface tension of the liquid spray, indicating that the contamination of the surface is less than that of the predetermined value. If the liquid spray forms generally sphreical droplets on the panel which tend to bead or to run off the surface rapidly, however, then the critical surface tension of the surface is less than that of the spray solution and the surface contamination exceeds the predetermined contamination level.

What is claimed is:
1. The method of evaluating the cleanliness of a material surface through the application of a liquid thereto, comprising the steps of:
   determining a first data point defined by the contact angle which a drop of selected liquid of a certain surface tension assumes when placed on a surface of a material to be evaluated;
   determining a second data point defined by placing on said surface a second drop of said liquid the surface tension of which has been reduced to a level where the angle of contact of the second drop first is substantially zero degrees and by determining the surface tension of the liquid of which said second drop is composed;
   establishing a linear relationship characterized by said first and second data points, said linear relationship defining a cosine function of the contact angle as a first variable and defining the surface tension as a second variable to provide a data base from which the cleanliness of test surfaces made of the same material can be evaluated;
   placing a drop of said liquid of certain surface tension on a test surface of said material and determining the angle of contact thereof;
   generating a second linear relationship having the same slope as said first linear relationship and further defined by said second variable corresponding to surface tension being equal to the known surface tension of the liquid drop placed on the test surface; and
   obtaining from said second linear relationship the value of surface tension corresponding to said cosine function of a contact angle of zero degrees, said value of surface tension thus obtained being the critical surface of the test surface.
2. The method of evaluating the cleanliness of a workpiece material surface through the application of a liquid thereon, comprising the steps of:
   plotting on a grid structure a first data point obtained by measuring the contact angle which a drop of selected liquid having a certain surface tension assumes when placed on a surface of a material to be evaluated,
   said step of plotting including locating the certain surface tension along a first axis of the grid structure and locating the cosine of the angle of contact along a second axis of the grid structure;
   plotting on the grid structure a second data point obtained by measuring the surface tension of a drop of said liquid placed on said material surface and reduced in surface tension to a point where the angle of contact first is substantially equal to zero;
   generating on the grid structure the linear relationship defined by the first and second data points;
   plotting on the grid structure a test data point obtained by measuring the angle of contact which a drop of said selected liquid assumes when placed on the surface of a workpiece made of said material;
   generating on the grid structure a second linear relationship parallel to the first-mentioned linear relationship and additionally defined by the inclusion of said test data point; and
   extending said second linear relationship to the location on the second axis of the grid structure corresponding to a contact angle of zero degrees,
   the location on the first axis which denotes the surface tension corresponding to said location of zero degrees on the second axis being the critical surface tension of the workpiece.
3. The method as in claim 2, wherein the test data point is obtained by placing a test drop having a known volume of said selected liquid on the surface of the workpiece;
   measuring the diameter assumed by the test drop on the surface of the workpiece; and generating a function of the contact angle from the measured drop diameter.

4. The method as in claim 3, wherein said function of the contact angle is generated by solving the equation:

$$\frac{D^3}{V} = \frac{24 \sin^3 \theta}{(2 - 3 \cos \theta + \cos^3 \theta)}$$

where
D = drop diameter in mm.,
V = drop volume in microliters, and
θ = contact angle
for said function of the contact angle.

References Cited

"Contact Angle Wettability and Adhesion," pp. 21 and 24, 1964, Library No. QD 506 C65.

"Physical Chemistry of Surfaces," Adamson, 1960 p. 271, Library No. QD 506 A 33.

RICHARD C. QUEISSER, Primary Examiner

E. J. KOCH, Assistant Examiner

U.S. Cl. X.R.

73—64.4